(12) United States Patent
Lim et al.

(10) Patent No.: US 11,454,374 B2
(45) Date of Patent: Sep. 27, 2022

(54) ILLUMINATION APPARATUS FOR MOBILITY

(71) Applicants: Hyundai Motor Company, Seoul (KR); Kia Corporation, Seoul (KR); SL Corporation, Daegu (KR)

(72) Inventors: Jung Wook Lim, Seoul (KR); Jin Hee Yu, Gyeongsan-si (KR); Dong Gyu Lee, Gyeongsan-si (KR); Jong Soon Yim, Gwangmyeong-si (KR); Jin Sik Nam, Gyeongsan-si (KR); Sang Hyoung Lee, Gyeongsan-si (KR)

(73) Assignees: Hyundai Motor Company, Seoul (KR); Kia Corporation, Seoul (KR); SL Corporation, Daegu (KR)

( * ) Notice: Subject to any disclaimer, the term of this patent is extended or adjusted under 35 U.S.C. 154(b) by 0 days.

(21) Appl. No.: 17/525,857

(22) Filed: Nov. 12, 2021

(65) Prior Publication Data

US 2022/0074574 A1 Mar. 10, 2022

Related U.S. Application Data

(63) Continuation-in-part of application No. 16/787,466, filed on Feb. 11, 2020, now Pat. No. 11,199,303.

(30) Foreign Application Priority Data

Aug. 1, 2019 (KR) .................. 10-2019-0093745

(51) Int. Cl.
  *F21V 14/04* (2006.01)
  *F21V 7/04* (2006.01)
  *F21V 7/00* (2006.01)
  *F21V 14/08* (2006.01)
  *F21V 11/08* (2006.01)

(52) U.S. Cl.
  CPC ............ *F21V 14/04* (2013.01); *F21V 7/0033* (2013.01); *F21V 7/04* (2013.01); *F21V 11/08* (2013.01); *F21V 14/08* (2013.01)

(58) Field of Classification Search
  CPC .......... F21V 14/04; F21V 7/0033; F21V 7/04; F21V 11/08; F21V 14/08; B60Q 1/46; F21S 41/43; F21S 41/686; F21S 41/321; F21S 41/675; F21S 41/148; F21W 2102/13; F21W 2102/155; F21W 2102/40; F21W 2104/00
  See application file for complete search history.

(56) References Cited

U.S. PATENT DOCUMENTS 5,412,543 A * 5/1995 Kobayashi ............ F21S 41/675
                                                    362/524
5,769,525 A    6/1998 Daumueller et al.
                    (Continued)

FOREIGN PATENT DOCUMENTS

DE        19806638 C2   12/1999
EP         2902701 B1    2/2015
                    (Continued)

*Primary Examiner* — Tsion Tumebo
(74) *Attorney, Agent, or Firm* — Morgan, Lewis & Bockius LLP (57) ABSTRACT

An illumination apparatus of mobility that implements various illumination functions includes a low beam and a high beam and provides a sense of operation when respective illumination functions are switched such that the design is upgraded.

20 Claims, 7 Drawing Sheets

(56) References Cited

U.S. PATENT DOCUMENTS

| | | |
|---|---|---|
| 6,457,849 B2 | 10/2002 | Tsukamoto |
| 6,921,188 B2 | 7/2005 | Taniuchi |
| 7,008,094 B2 | 3/2006 | Taniuchi |
| 7,478,934 B2 | 1/2009 | Lee |
| 7,484,864 B2 | 2/2009 | Okada |
| 8,240,896 B2 | 8/2012 | Abe |
| 2002/0085387 A1* | 7/2002 | Taniuchi ............... F21S 41/321 362/524 |
| 2002/0089853 A1 | 7/2002 | Taniuchi |
| 2003/0214474 A1 | 11/2003 | Aoki |
| 2007/0236951 A1 | 10/2007 | Albou |
| 2008/0266890 A1 | 10/2008 | Mochizuki et al. |
| 2015/0204503 A1 | 7/2015 | Krenn et al. |
| 2017/0336044 A1 | 11/2017 | Song |
| 2018/0009374 A1 | 1/2018 | Kim |
| 2018/0154819 A1 | 6/2018 | Hoshino |
| 2020/0149702 A1 | 5/2020 | Takii |

FOREIGN PATENT DOCUMENTS

| | | |
|---|---|---|
| EP | 3094919 B1 | 3/2018 |
| EP | 3176493 B1 | 12/2020 |
| JP | 2015-115276 A | 6/2015 |
| KR | 10-2021-0016166 A | 2/2021 |

\* cited by examiner

ILLUMINATION APPARATUS FOR MOBILITY

CROSS REFERENCE TO RELATED APPLICATION

The present application is a continuation-in-part (CIP) of U.S. application Ser. No. 16/787,466 filed on Feb. 11, 2020, which claims the priority to Korean Patent Application No. 10-2019-0093745, filed on Aug. 1, 2019, the entire contents of which is incorporated herein for all purposes by this reference.

BACKGROUND OF THE INVENTION

Field of the Invention

The present invention relates to an illumination apparatus of mobility in which various illumination functions including a low beam and a high beam are implemented.

Description of Related Art

In general, mobility includes a lighting apparatus used to help see objects in the driving direction during night-time driving and to make the driving state of the vehicle known to other vehicles or other road users. A lamp, also known as a headlight, is an illuminating lamp that functions to light the way ahead of the vehicle in the driving direction.

The lamps are classified into a headlamp, a daytime running lamp, a fog lamp, a direction indicator lamp, a brake lamp, a rear driving lamp, and the like, and each one is set to illuminate the road in different directions.

Since the lamps need to emit lights of various functions, components for performing the respective lamp functions are provided. That is, each lamp performs one function, respectively so that installation structure becomes complicated and design is hard to come by.

Furthermore, even when it comes to the switching of lamp functions, there is a limit in designing the illumination of the lamp by simply turning on or off the lamp.

Accordingly, the realization of a lamp that secures both the illumination functions and the design of the lamp is required.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an illumination apparatus of mobility that implements various illumination functions including a low beam and a high beam and provides a sense of operation when the respective illumination functions are switched such that the design is upgraded.

According to various aspects of the present invention, the illumination apparatus of mobility includes a light source unit configured to emit light; a fixed reflection unit configured to reflect the light emitted from the light source unit; a rotating reflection unit which is rotatably provided between the light source unit and the fixed reflection unit and includes a plurality of reflecting surfaces in rotation directions thereof; and a shield unit which is rotatably provided between the light source unit and the rotating reflection unit and includes a plurality of opening holes having opening shapes different from each other in the rotation directions, and illumination images and beaming directions of the light emitted from the light source unit change according to the rotation positions of the rotating reflection unit and the shield unit so that a plurality of illumination functions is implemented.

The fixed reflection unit may be formed to implement a high beam when the light emitted from the light source unit is reflected by the fixed reflection unit.

The rotating reflection unit may be rotatably provided in an axial direction of the apparatus and include a first reflecting surface and a second reflecting surface respectively provided on either side of an axis center of the apparatus.

The first reflecting surface may be formed to implement a low beam when the light emitted from the light source unit is reflected by the first reflecting surface.

The shield unit may be rotatably provided in an axial direction of the apparatus together with the rotating reflection unit and include a first opening hole matching the first reflecting surface and a second opening hole matching the second reflecting surface respectively formed on a first side and a second side of the axis center of the apparatus.

The first opening hole may be formed to block a portion of the light emitted from the light source unit so that the light emitted from the light source unit may be incident on the first reflecting surface only.

The second opening hole may be formed to be greater than the first opening hole so that the light emitted from the light source unit may be incident on the second reflecting surface and the fixed reflection unit.

The light source unit may include a first light source and an auxiliary light source, and the first light source emits light to the rotating reflection unit and the fixed reflection unit while the second light source emits light to the fixed reflection unit only.

The shield unit may include a third opening hole which is formed to be spaced outwardly in a radial direction of the apparatus from the first opening hole outward and matches the second light source when the first opening hole is positioned to match the first light source.

The second light source may be disposed to be spaced outwardly from the first light source outward and emit light to the fixed reflection unit through the third opening hole.

A plurality of illumination apparatuses for mobility may be provided. The first light source may be operated in each illumination apparatus of mobility when the low beam is implemented, and an additional illumination function may be implemented when the first light source and the second light source of a predetermined illumination apparatus of mobility among the plurality of illumination apparatuses for mobility are operated while the low beam is implemented.

The rotating reflection unit may further include a third reflecting surface between the first reflecting surface and the second reflecting surface disposed on either side of the axis center.

The third reflecting surface may be formed to have a predetermined image including a circle or a polygon and implement an illumination function other than the low beam and the high beam when the light emitted from the light source unit is reflected by the third reflecting surface.

The shield unit may include a fourth opening hole that matches the third reflecting surface.

The rotating reflection unit and the shield unit are provided, a driving unit adjusting the rotational positions of the rotating reflection unit and shield unit provided may be further included.

The driving unit may include a driving motor that transmits rotational power and a power transmission unit which is coupled to the driving motor to receive the rotational power, is connected to the axis center portion of the rotating reflection unit and the shield unit, and includes a plurality of gears.

A plurality of illumination apparatuses for mobility including the light source units, fixed reflection units, rotating reflection units, and shield units may be provided, and each illumination apparatus of mobility includes a driving unit, respectively.

The illumination apparatus of mobility having a structure as described above may implement various illumination functions including a low beam and a high beam in a single illumination and provide a sense of operation when respective illumination functions are switched such that the design is upgraded.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following, an illumination apparatus of mobility according to various exemplary embodiments of the present invention will be described with reference to the accompanying drawings.

Figure 1:
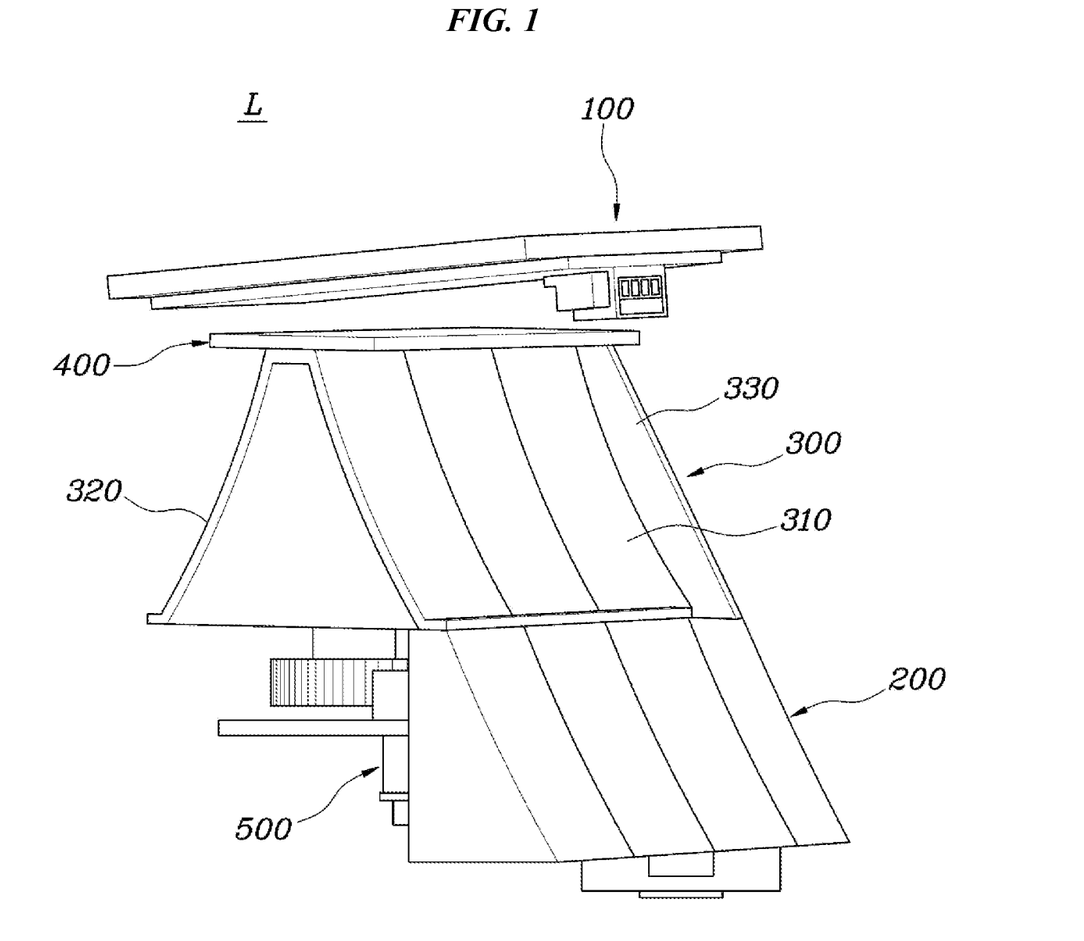
FIG. 1 is a view showing an illumination apparatus of mobility according to various exemplary embodiments of the present invention.
Figure 2:
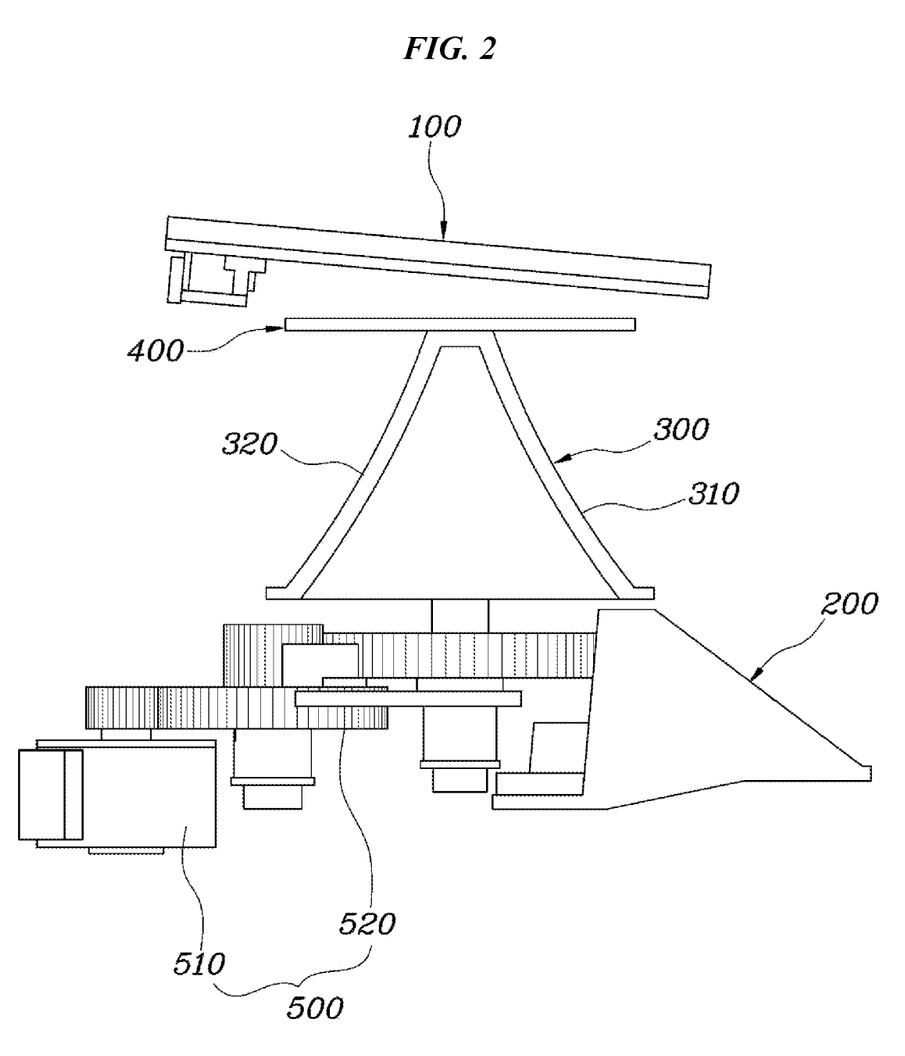
FIG. 2 is a side view showing the illumination apparatus of mobility shown in FIG. 1.
Figure 3:
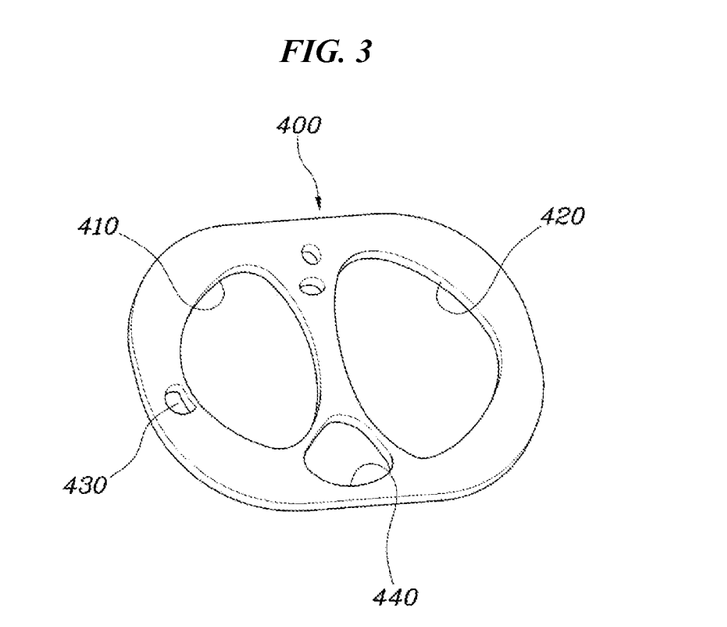
FIG. 3 is a view showing a shield unit of the present invention.

FIG. 1 is a view showing an illumination apparatus of mobility according to various exemplary embodiments of the present invention, FIG. 2 is a side view showing the illumination apparatus of mobility shown in FIG. 1, and FIG. 3 is a view showing a shield unit of the present invention.

Figure 4:
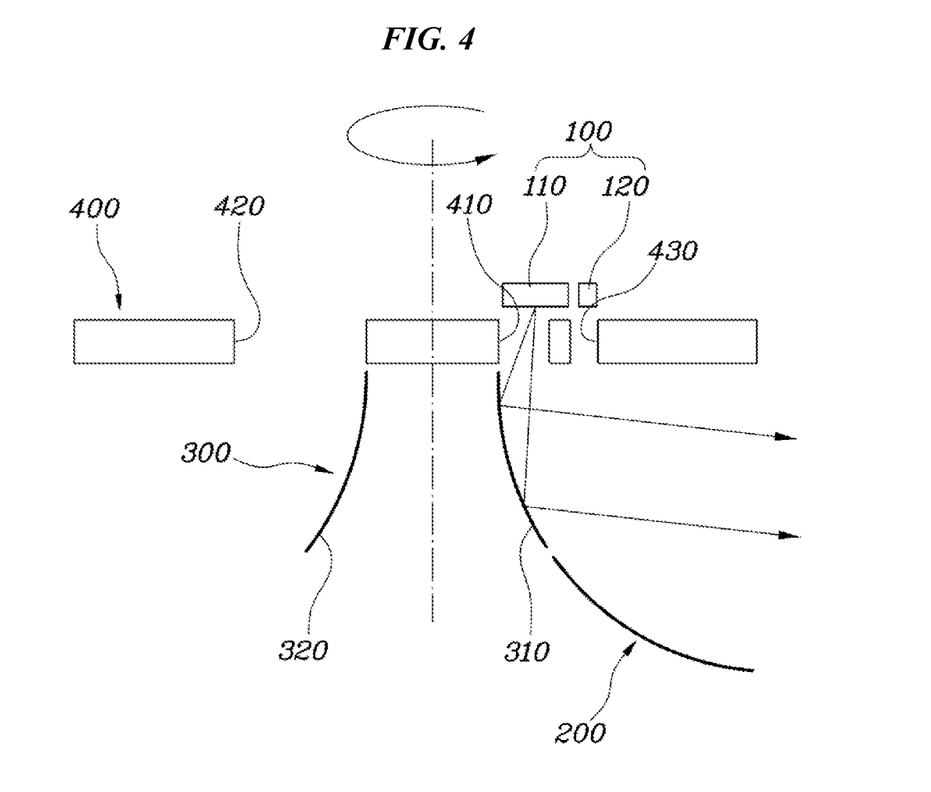
FIG. 4 is a view for describing an implementation of a low beam function of the present invention.
Figure 5:
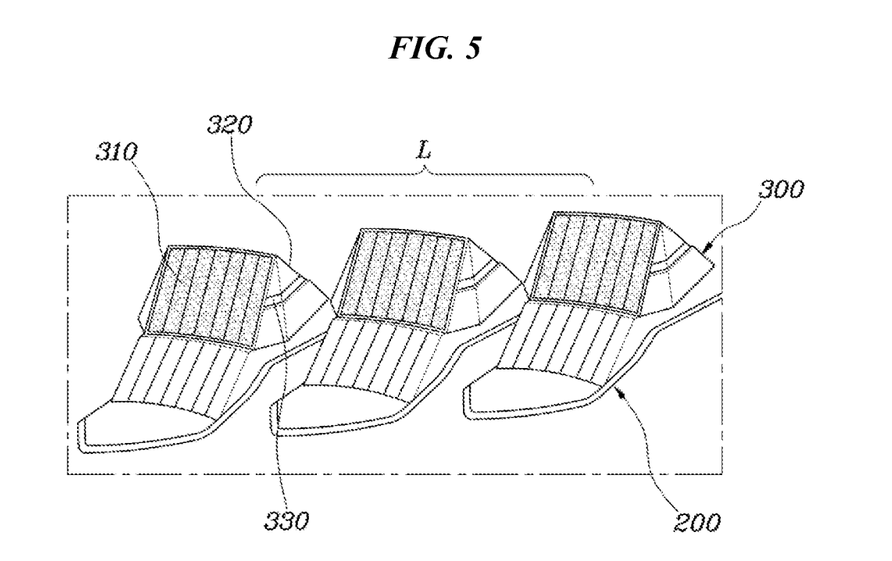
FIG. 5 is a view showing various exemplary embodiments of the present invention when the low beam function is implemented.

FIG. 4 is a view for describing an implementation of a low beam function of the present invention, and FIG. 5 is a view showing various exemplary embodiments of the present invention when the low beam function is implemented.

Figure 6:
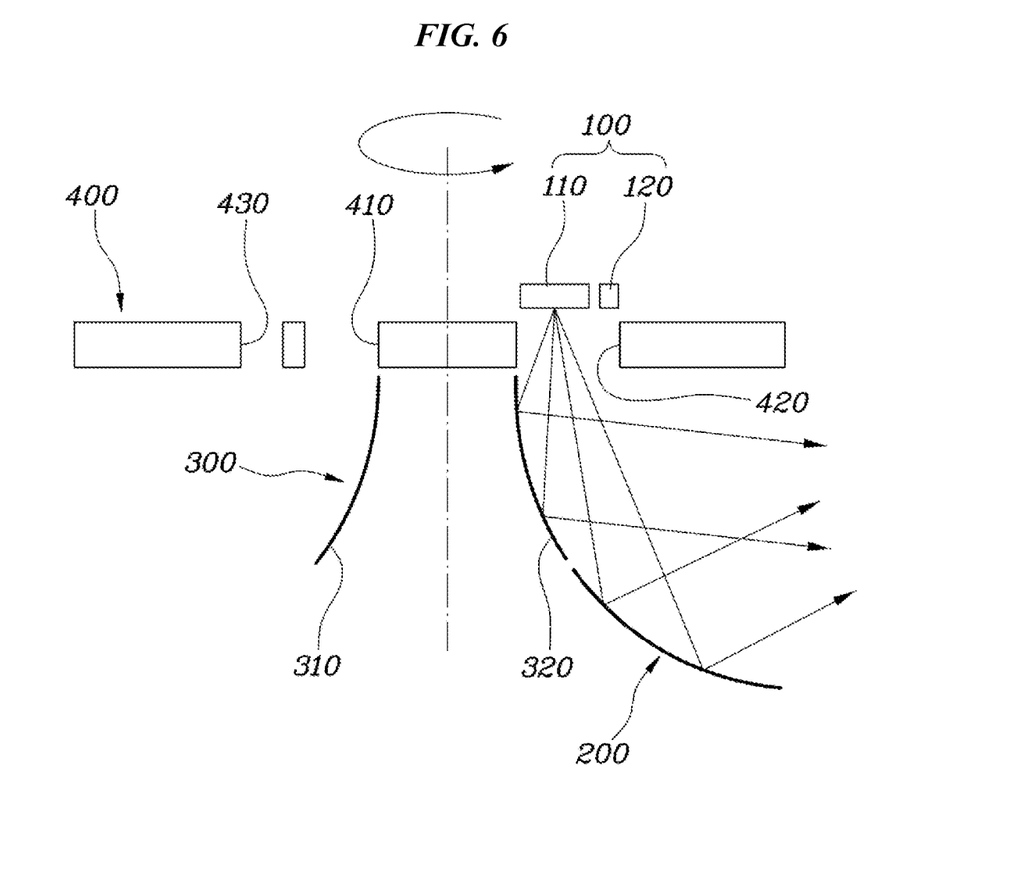
FIG. 6 is a view for describing an implementation of a high beam function of the present invention.
Figure 7:
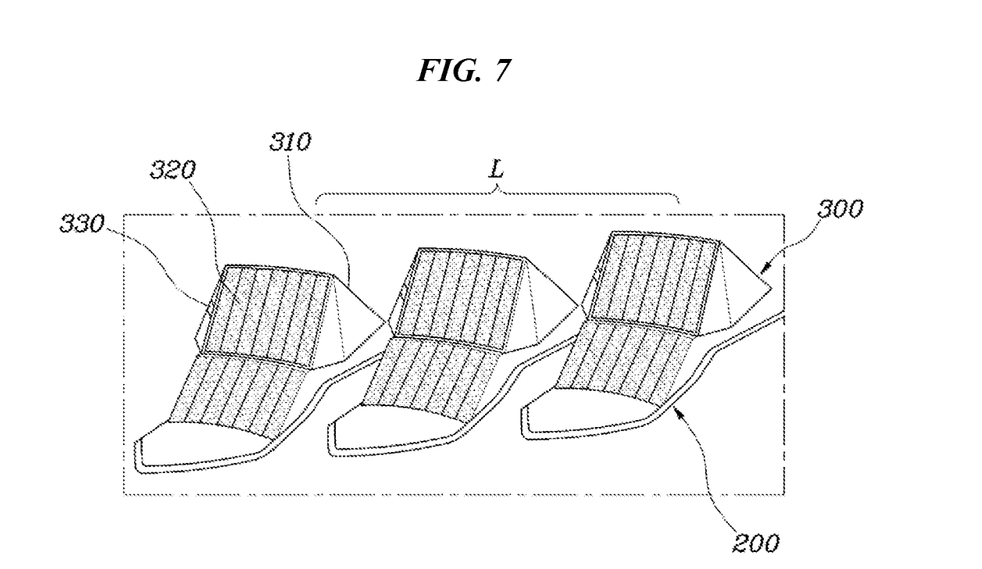
FIG. 7 is a view showing various exemplary embodiments of the present invention when a high beam function is implemented.

FIG. 6 is a view for describing an implementation of a high beam function of the present invention, and FIG. 7 is a view showing various exemplary embodiments of the present invention when the high beam function is implemented.

Figure 8:
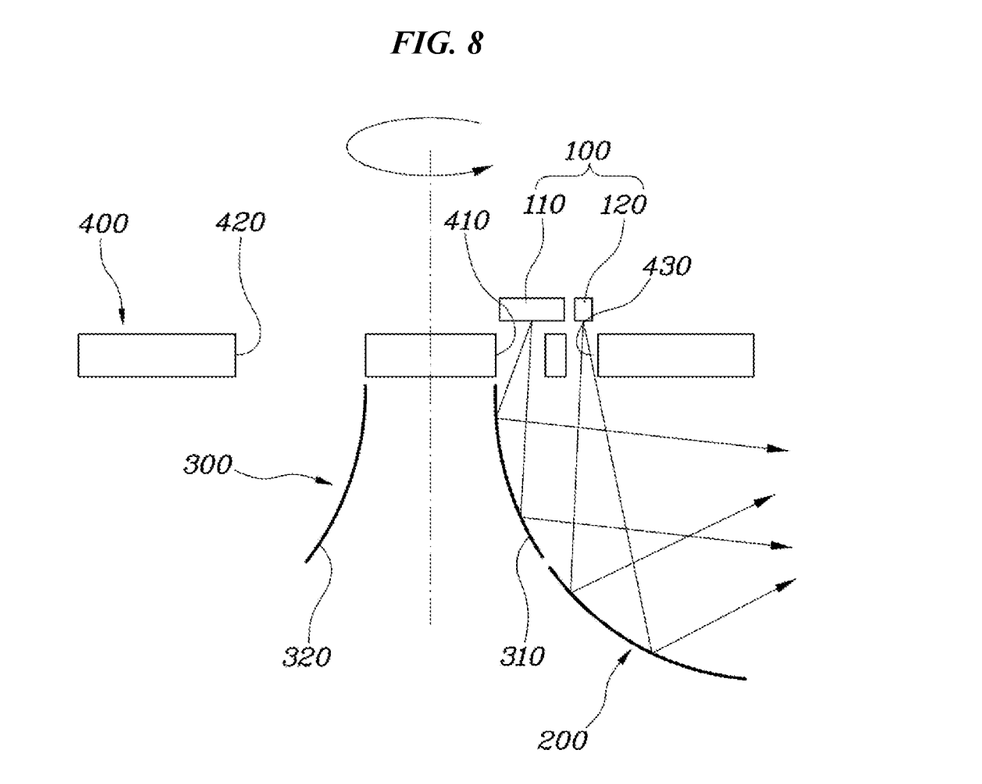
FIG. 8 is a view for describing an implementation of a flash function of the present invention.
Figure 9:
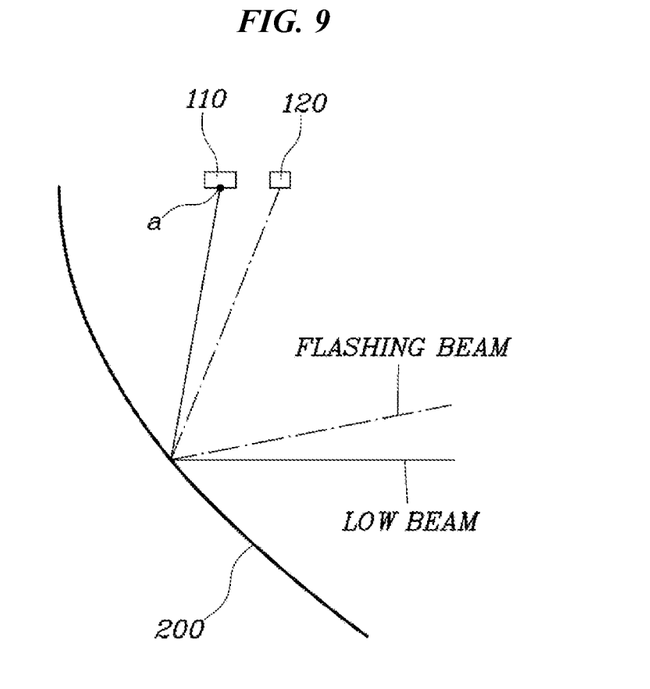
FIG. 9 is a view for describing light-emitting directions depending on a main light source and an auxiliary light source of the present invention.
Figure 10:
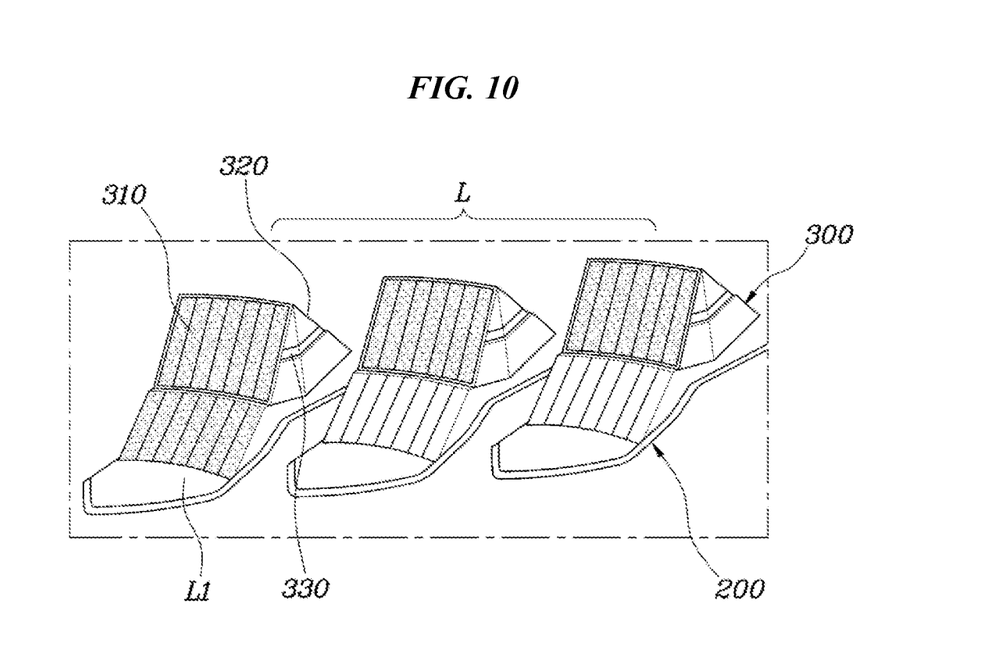
FIG. 10 is a view showing various exemplary embodiments of the present invention when a flash function is implemented.

FIG. 8 is a view for describing an implementation of a flash function of the present invention, FIG. 9 is a view for describing light-emitting directions depending on a main light source and an auxiliary light source of the present invention, and FIG. 10 is a view showing various exemplary embodiments of the present invention when a flash function is implemented.

Figure 11:
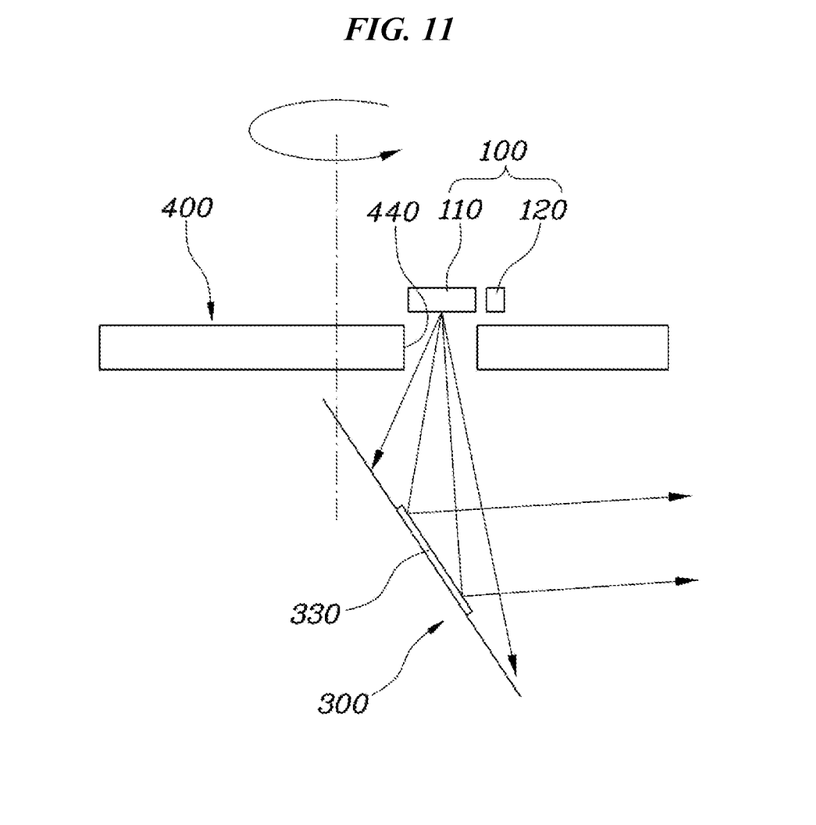
FIG. 11 is a view for describing an implementation of a design function of the present invention.
Figure 12:
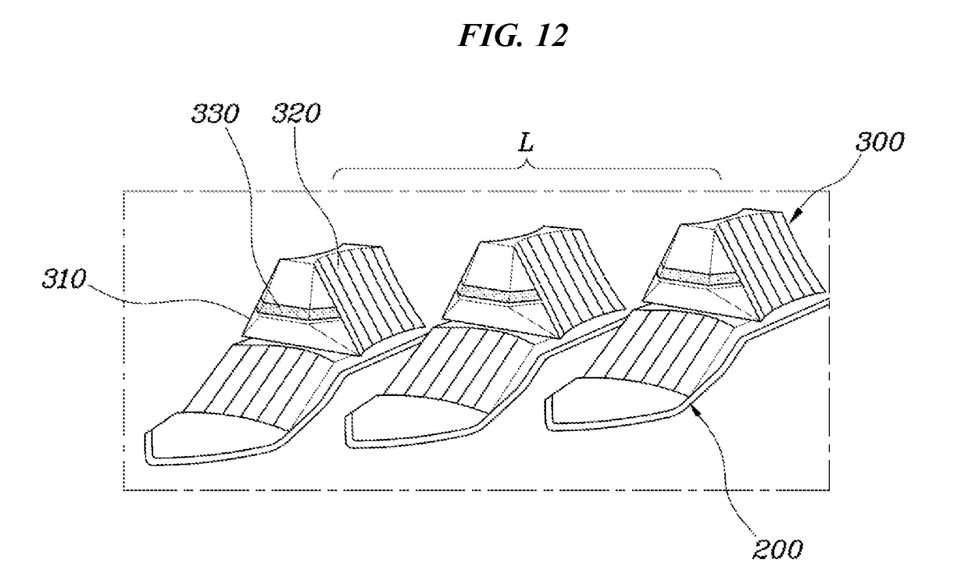
FIG. 12 is a view showing various exemplary embodiments of the present invention when the design function is implemented.

Furthermore, FIG. 11 is a view for describing an implementation of a design function of the present invention, and FIG. 12 is a view showing various exemplary embodiments of the present invention when the design function is implemented.

As shown in FIG. 1 and FIG. 2, the illumination apparatus of mobility according to various exemplary embodiments of the present invention includes a light source unit 100 emitting light; a fixed reflection unit 200 reflecting the light emitted from the light source unit 100; a rotating reflection unit 300 which is rotatably provided between the light source unit 100 and the fixed reflection unit 200 and includes a plurality of reflecting surfaces in rotating directions; and shield unit 400 which is rotatably provided between the light source unit 100 and the rotating reflection unit 300 and includes a plurality of opening holes having opening shapes different from each other in the rotation directions.

As described above, the present invention includes the light source unit 100, the fixed reflection unit 200, the rotating reflection unit 300, and the shield unit 400, and the rotation of the rotating reflection unit 300 and the shield unit 400 causes the light emitted from the light source unit 100 to be selectively incident on the fixed reflection unit 200 and the rotating reflection unit 300 and the reflection direction and reflection form of light to change. This allows the present invention to implement various illumination functions.

Here, the light source unit 100 may be configured with the LEDs and may be provided with a heat sink so that the heat generated by light emission is dissipated and the light source is cooled.

The fixed reflection unit 200 is configured with reflecting mirrors that reflect the light incident from the light source unit 100 and is formed to have a curvature so that the incident light switches the moving directions and is reflected to beam to the outside.

The fixed reflection unit 200 has curvature gradients formed such that a high beam is implemented when the light emitted from the light source unit 100 is reflected to beam to the outside. That is, the light source unit 100 and the fixed reflection unit 200 are spaced from each other in the up/down direction, and the light emitted from the light source unit 100 switches moving directions when the light gets incident on the fixed reflection unit 200 to beam in the direction in which a high beam is implemented so that the illumination apparatus L has a high beam function. As used herein, the term "curvature gradient" means a gradient of a curved surface or line.

The rotating reflection unit 300 is rotatably provided between the light source unit 100 and the fixed reflection unit 200 and includes a plurality of reflecting surfaces 310 provided in the rotation directions. The rotating reflection unit 300 implements a low beam by the respective reflecting surfaces. That is, the respective reflecting surfaces forming the rotating reflection unit 300 have curvature gradients formed such that a low beam is implemented when the light emitted from the light source unit 100 is reflected to beam to the outside.

Along with this, the shield unit 400 is rotatably provided between the light source unit 100 and the rotating reflection unit 300. The shield unit 400 includes a plurality of opening holes having opening shapes different from each other in the rotation directions such that the light emitted from the light source unit 100 partially or fully passes through the opening holes to be selectively incident on the rotating reflection unit 300 and the fixed reflection unit 200. That is, the respective opening holes of the shield unit 400 have opening shapes different from each other such that the light emitted from the light source unit 100 is incident on the rotating reflection unit 300 only or incident on both the rotating reflection unit 300 and the fixed reflection unit 200, depending on the respective opening holes matching the light source unit 100, so that various illumination functions are implemented.

This allows the light emitted from the light source unit 100 to be selectively reflected by the rotating reflection unit 300 and the fixed reflection unit 200 to beam out according to the rotational positions of the rotating reflection unit 300 and the shield unit 400 such that illumination images and beaming directions so that a plurality of illumination functions is implemented.

To be more specific about the present invention described above, as shown in FIG. 1, FIG. 2, FIG. 3, and FIG. 4, the rotating reflection unit 300 is axially rotatably provided and includes a first reflecting surface 310 and a second reflecting surface 320 provided on either side of an axis center respectively.

The first reflecting surface 310 and the second reflecting surface 320 may be formed to implement a low beam when the light emitted from the light source unit 100 is reflected by the first reflecting surface 310 and the second reflecting surface 320. Furthermore, the first reflecting surface 310 and the second reflecting surface 320 may have the same curvature gradients so that the light may switch the beaming direction according to the positions of the opening holes, the positions being determined by the rotational position of the shield unit 400.

Accordingly, a low beam may be implemented when the light emitted from the light source unit 100 is incident on the first reflecting surface 310 or the second reflecting surface 320 of the rotating reflection unit 300 according to the rotational position of the shield unit 400, and a high beam may be implemented when the light is incident on both the rotating reflection unit 300 and the fixed reflection unit 200.

Furthermore, the first reflecting surface 310 and the second reflecting surface 320 may have curvatures different from each other so that different illumination functions may be implemented when the light is reflected by the first reflecting surface 310 and the second reflecting surface 320. Accordingly, the first reflecting surface 310 and the second reflecting surface 320 may be formed in shapes different from each other such that the light may be beamed in different directions in different forms according to the reflecting surfaces of the first reflecting surface 310 and the second reflecting surface 320 when the light emitted from the light source unit 100 is reflected so that another illumination function including the low beam may be implemented.

The shield unit 400 interlocked with the rotating reflection unit 300 described above is axially rotatably provided together with the rotating reflection unit 300, and a first opening hole 410 matching the first reflecting surface 310 and a second opening hole 420 matching the second reflecting surface 320 are respectively formed on either side of the axis center of the apparatus.

That is, the rotating reflection unit 300 and the shield unit 400 are coaxially rotatably provided. Furthermore, the shield unit 400 includes the first opening hole 410 matching the first reflecting surface 310 and the second opening hole 420 matching the second reflecting surface 320 on either side of the axis center respectively.

Since the installation of the light source unit 100 at a fixed position allows the first reflecting surface 310 and the first opening hole 410, or the second reflecting surface 320 and the second opening hole 420, to be selectively matched to the light source unit 100 according to the rotational positions of the rotating reflection unit 300 and the shield unit 400.

The first opening hole 410 and the second opening hole 420 are formed in opening shapes different from each other so that the light emitted from the light source unit 100 partially or fully passes through.

For example, the first opening hole 410 is formed to block a portion of the light emitted from the light source unit 100 so that the light emitted from the light source unit 100 is incident on the first reflecting surface 310 only, while the second opening hole 420 is formed to be greater than the first opening hole 410 so that the light emitted from the light source unit 100 is incident on the second reflecting surface 320 and the fixed reflection unit 200.

Accordingly, as shown in FIG. 4, when the shield unit 400 is rotated such that the first opening hole 410 is positioned to match the light source unit 100, a portion of the light emitted from the light source unit 100 is blocked by the shield unit 400 and a portion of the light passes through the first opening hole 410 to be incident on the first reflecting surface 310. Here, the light emitted from the light source unit 100 moves in a direction in which a low beam is implemented according to the curvature gradients of the first reflecting surface 310. This allows the implementation of the low beam when the rotating reflection unit 300 and the shield unit 400 are rotated such that the first opening hole 410 is positioned to match the light source unit 100.

Furthermore, as shown in FIG. 5, light beams out only from the area of the rotating reflection unit 300 in each illumination apparatus L so that the design according to the implementation of the low beam is distinguished.

On the other hand, as shown in FIG. 6, when the shield unit 400 is rotated such that the second opening hole 420 is positioned to match the light source unit 100, the light emitted from the light source unit 100 passes through the second opening hole 420 to be incident on the first reflecting surface 310 and the second reflecting surface 320. That is, the second opening hole 420 is formed to be greater than the first opening hole 410 so that the light from the light source unit 100 passes through the second opening hole 420 to be incident on both the rotating reflection unit 300 and the fixed reflection unit 200. Here, the light from the light source unit 100 moves in a direction in which a low beam is implemented according to the curvature gradients of the second reflecting surface 320 and moves in a direction in which a high beam is implemented according to the curvature gradients of the fixed reflection unit 200. This allows the implementation of the high beam when the rotating reflection unit 300 and the shield unit 400 are rotated such that the second opening hole 420 is positioned to match the light source unit 100.

Furthermore, as shown in FIG. 7, light beams out from both areas of the rotating reflection unit 300 and the fixed reflection unit 200 in each illumination apparatus L so that the design according to the implementation of the high beam is distinguished.

On the other hand, according to another exemplary embodiment of the present invention, as shown in FIG. 8, the light source unit 100 includes a main light source 110 and an auxiliary light source 120, and the main light source 110 may emit light to the rotating reflection unit 300 and the fixed reflection unit 200, while the auxiliary light source 120 may emit light to the fixed reflection unit 200 only. Here, the auxiliary light source 120 may be provided to emit light to the fixed reflection unit 200 even when the rotating reflection unit 300 and the shield unit 400 are rotated such that the first reflecting surface 310 and the first opening hole 410 match the light source unit 100.

As described above, the light source unit 100 may include the auxiliary light source 120 for further implementing an illumination function along with the main light source 110 for implementing a low beam and a high beam. Here, since the main light source 110 implements a high beam and a low beam and the auxiliary light source 120 performs an additional function or assists the main light source 110, the amount of light of the main light source 110 may be set higher than the amount of light of the auxiliary light source 120.

The shield unit 400 may include a third opening hole 430 which is disposed to be spaced outwardly from the first opening hole 410 and matches the auxiliary light source 120 when the first opening hole 410 is positioned to match the main light source 110.

Furthermore, the auxiliary light source 120 is disposed to be spaced outwardly from the main light source 110 and emits light toward the fixed reflection unit 200 through the third opening hole 430.

This is for implementing a flash function among the illumination functions and is for momentarily turning on the high beam positioned higher than the low beam in a state where the low beam is implemented.

That is, the rotating reflection unit 300 and the shield unit 400 are rotated such that the first reflecting surface 310 and the first opening hole 410 match the main light source 110 to implement the low beam. For the present reason, the light emitted from the main light source 110 passes through the first opening hole 410 and switches the moving directions by the first reflecting surface 310, implementing the low beam when beaming out.

On the other hand, when the flash function is implemented, the auxiliary light source 120 is operated and the light emitted from the auxiliary light source 120 passes through the third opening hole 430 and moves to the fixed reflection unit 200. As shown in FIG. 9, the fixed reflection unit 200 is formed in a parabolic shape and the focal point (a) of the parabola is positioned in the main light source 110. The auxiliary light source 120 is disposed to be spaced outwardly from the main light source 110 and is consequently disposed at a shorter distance than the focal point (a) of the parabola so that the light emitted from the auxiliary light source 120 moves above the low beam when the light is reflected by the fixed reflection unit 200.

This allows the additional implementation of the flash function among the illumination functions in a state where the low beam is implemented.

On the other hand, as shown in FIG. 10, a plurality of illumination apparatuses L may be provided. Here, when the low beam is implemented, the main light source 110 in each illumination apparatus is operated and the rotating reflection unit 300 and the shield unit 400 are rotated so that the first reflecting surface 310 and the first opening hole 410 are positioned to match the main light source 110. This allows the implementation of the low beam of each illumination apparatus L.

When the main light source 110 and the auxiliary light source 120 of a specific illumination apparatus L1 among a plurality of illumination apparatuses L are operated in a state where the low beam is implemented, light beams out by the rotating reflection unit 300 and the fixed reflection unit 200 in the specific illumination apparatus L1. Accordingly, as shown in FIG. 10, the light beams out from both the rotating reflection unit 300 and the fixed reflection unit 200 in the specific illumination apparatus L1 while the low beam is implemented so that each illumination apparatus may implement an additional illumination function of changing a design or further securing an additional amount of light, including the flash function.

On the other hand, according to various exemplary embodiments of the present invention, the rotating reflection unit 300 may further include a third reflecting surface 330 between the first reflecting surface 310 and the second reflecting surface 320 disposed on either side of the axis. The third reflecting surface 330 is for implementing an illumination function different from the illumination functions of the first reflecting surface 310 and the second reflecting surface 320 and may have a different shape.

That is, the third reflecting surface 330 is formed to have a specific image including a circle or a polygon so that an illumination function other than the low beam and the high beam is implemented when the light emitted from the light source unit 100 is reflected by the third reflecting surface 330.

Furthermore, the shield unit 400 may include a fourth opening hole 440 matching the third reflecting surface 330. The fourth opening hole 440 may be formed so that the light emitted from the light source unit 100 is incident on the third reflecting surface 330 and may be formed in the same shape as the third reflecting surface 330.

As shown in FIG. 11 and FIG. 12, the third reflecting surface 330 extends in a straight line according to the various exemplary embodiments of the present invention. The present allows the formation of an illumination image in a straight line when the light emitted from the light source unit 100 is reflected by the third reflecting surface 330, and thus, the implementation of a design function including a welcome function.

As described above, the design function may be determined according to the shapes of the third reflecting surface 330 of the rotating reflection unit 300 and the fourth opening hole 440 of the shield unit 400, and various illumination images may be implemented by design creation.

On the other hand, as shown in FIG. 1, the rotating reflection unit 300 and the shield unit 400 are provided, and a driving unit 500 adjusting the rotational positions of the rotating reflection unit 300 and the shield unit 400 is further included.

The driving unit 500 generates the rotational power and the rotating reflection unit 300 and the shield unit 400 are provided coaxially with the driving unit 500 so that the rotating reflection unit 300 and the shield unit 400 are rotated together and the rotational positions are adjusted according to whether the driving unit 500 is operated.

The driving unit 500 may include a driving motor 510 that transmits rotational power and a power transmission unit 520 which is connected to the driving motor 510 to receive the rotational power, is connected to the axis center of the rotating reflection unit 300 and the shield unit 400, and includes a plurality of gears.

Here, the driving motor 510 may be configured for forward and reverse rotations and is connected to the rotating reflection unit 300 and the shield unit 400 via the power transmission unit 520 that includes a plurality of gears. The power transmission unit 520 has a structure of a reduction gear through the gear ratio of the respective gears so that the rotational positions of the rotating reflection unit 300 and the shield unit 400 may be precisely adjusted according to whether the driving motor 510 is operated Furthermore, there may be provided a plurality of illumination apparatuses L that include the light source units 100, the fixed reflection units 200, the rotating reflection units 300, and the shield units 400 of the present invention.

Each illumination apparatus L includes a driving unit 500 separately so that the rotational positions of the rotating reflection unit 300 and the shield unit 400 of each illumination apparatus L may be individually controlled.

Here, each driving unit 500 may be individually controlled by a controller, and the sense of operation coming from the implementation of illumination functions may be diversified through sequential execution of operation timing or partial operation of the respective driving units 500.

The illumination apparatus of mobility L having the structure as described above implements various illumination functions including a low beam and a high beam in a single illumination and provides a sense of operation when the respective illumination functions are switched such that the design is upgraded.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can further be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An illumination apparatus of mobility, the illumination apparatus comprising:
   a light source unit configured to emit light;
   a fixed reflection unit configured to reflect the light emitted from the light source unit;
   a rotating reflection unit which is rotatably provided between the light source unit and the fixed reflection unit and includes a plurality of reflecting surfaces in rotation directions thereof; and
   a shield unit which is rotatably provided between the light source unit and the rotating reflection unit and includes a plurality of opening holes having opening shapes different from each other in the rotation directions,
   wherein illumination images and beaming directions of the light emitted from the light source unit change according to rotation positions of the rotating reflection unit and the shield unit so that a plurality of illumination functions is implemented.

2. The apparatus of claim 1, wherein the fixed reflection unit is formed to implement a first beam when the light emitted from the light source unit is reflected by the fixed reflection unit.

3. The apparatus of claim 1,
   wherein the rotating reflection unit is rotatably provided in an axial direction of the apparatus, and
   wherein the plurality of reflecting surfaces includes a first reflecting surface and a second reflecting surface respectively provided on a first side and a second side of an axis center of the apparatus.

4. The apparatus of claim 3, wherein the first reflecting surface implements a second beam when the light emitted from the light source unit is reflected by the first reflecting surface.

5. The apparatus of claim 3,
   wherein the plurality of opening holes includes a first opening hole and a second opening hole, and
   wherein the shield unit is rotatably provided in the axial direction of the apparatus together with the rotating reflection unit and includes the first opening hole matching the first reflecting surface and the second opening hole matching the second reflecting surface formed on either side of the axis center respectively.

6. The apparatus of claim 5, wherein the first opening hole is formed to block a portion of the light emitted from the light source unit so that the light emitted from the light source unit is incident on the first reflecting surface only.

7. The apparatus of claim 5, wherein an area of the second opening hole is formed to be greater than an area of the first opening hole so that the light emitted from the light source is incident on the second reflecting surface and the fixed reflection unit through the second opening hole.

8. The apparatus of claim 3,
   wherein the light source unit includes a first light source and a second light source, and
   wherein the first light source emits light to the rotating reflection unit and the fixed reflection unit while the second light source emits light to the fixed reflection unit only.

9. The apparatus of claim 8,
   wherein the plurality of opening holes includes a third opening hole, and
   wherein the shield unit includes the third opening hole which is formed to be spaced outwardly in a radial direction of the apparatus from the first opening hole and matches the second light source when the first opening hole is positioned to match the first light source.

10. The apparatus of claim 9, wherein the second light source is positioned to be spaced outwardly from the first light source and emits light toward the fixed reflection unit through the third opening hole.

11. The apparatus of claim 8,
    wherein a plurality of illumination apparatuses for mobility is provided,
    wherein the first light source is operated in each illumination apparatus of mobility when a second beam is implemented, and
    wherein an additional illumination function is implemented when the first light source and the second light source of a predetermined illumination apparatus of mobility among the plurality of illumination apparatuses for mobility are operated in a state where the second beam is implemented.

12. The apparatus of claim 3, wherein the first reflecting surface and the second reflecting surface have same curvature gradients so that the light switches the beaming directions according to positions of the opening holes, the positions being determined by a rotation position of the shield unit.

13. The apparatus of claim 3, wherein the first reflecting surface and the second reflecting surface have curvatures different from each other so that different illumination functions are implemented when the light is reflected by the first reflecting surface and the second reflecting surface.

14. The apparatus of claim 3, wherein the rotating reflection unit further includes a third reflecting surface between the first reflecting surface and the second reflecting surface disposed on either side of the axis center.

15. The apparatus of claim 14, wherein the third reflecting surface extends in a straight line to form a flat surface.

16. The apparatus of claim 14, wherein the third reflecting surface is formed to have a predetermined image including a circle or a polygon so that an illumination function other than a first beam or a second beam is implemented when the light emitted from the light source unit is reflected by the third reflecting surface.

17. The apparatus of claim 14,
    wherein the plurality of opening holes includes a fourth opening hole, and
    wherein the shield unit includes the fourth opening hole matching the third reflecting surface.

18. The apparatus of claim 1, further including a driving unit configured to adjust the rotation positions of the rotating reflection unit and the shield unit.

19. The apparatus of claim 18,
    wherein the driving unit includes a driving motor that transmits rotational power and a power transmission unit, and
    wherein the power transmission unit is coupled to the driving motor to receive the rotational power, is connected to the rotating reflection unit in an axial direction of the apparatus and the shield unit, and includes a plurality of gears.

20. The apparatus of claim 18,
wherein a plurality of illumination apparatuses for mobility including light source units, fixed reflection units, rotating reflection units, and shield units are provided, and
wherein each illumination apparatus of mobility includes the driving unit, respectively.

\* \* \* \* \*